United States Patent [19]
Hui

[11] Patent Number: 5,549,074
[45] Date of Patent: Aug. 27, 1996

[54] WATER DRINKING DEVICE FOR PETS

[76] Inventor: Cheng C. Hui, P.O. Box 453, Taichung, Taiwan

[21] Appl. No.: 436,095

[22] Filed: May 8, 1995

[51] Int. Cl.⁶ .................................................... A01K 5/00
[52] U.S. Cl. .................... 119/477; 248/225.21; 248/313; 119/475; 119/464
[58] Field of Search ............................ 119/18, 72, 72.5, 119/51.03, 75; 220/480, 482; 248/275.21, 304, 313

[56] References Cited

U.S. PATENT DOCUMENTS

| | | | |
|---|---|---|---|
| 3,952,906 | 4/1976 | Georgopulos | 220/480 X |
| 4,807,567 | 2/1989 | Atchley | 119/18 |
| 5,010,847 | 4/1991 | Braden | 119/18 |
| 5,363,802 | 11/1994 | Huff | 119/18 |
| 5,447,118 | 9/1995 | Huff et al. | 119/18 |

*Primary Examiner*—Gene Mancene
*Assistant Examiner*—Thomas Price

[57] ABSTRACT

A water drinking device for pets comprises a vessel provided at the top thereof with a cap having a ventilation hole. The vessel is further provided at the lower end thereof with a slanted bottom so as to ensure that the water outlet is located at a level higher than the bottom end of the vessel and that the water flowing out of the water outlet is free from impurities. The vessel is further provided peripherally at different levels thereof with a plurality of locating slots, each of which is provided respectively at both ends thereof with a locating recess engageable with a locating projection of the retaining arm of a vessel hanger.

6 Claims, 4 Drawing Sheets

WATER DRINKING DEVICE FOR PETS

FIELD OF THE INVENTION

The present invention relates generally to a water drinking device for animals, and more particularly to a water drinking device for pets.

BACKGROUND OF THE INVENTION

There are a variety of conventional water drinking devices for pets available at the market place today. These conventional water drinking devices for pets are generally defective in design in that they are provided with a water inlet which is too small to facilitate the replenishing of the devices with fresh water and the cleaning of the devices, and that they are provided with a water outlet located at the bottom thereof, thereby subjecting the pets to drinking the water contaminated by impurities which precipitate to the bottom of the device. In addition, such conventional water drinking devices for pets as described above are not provided with an apparatus for adjusting the position of the water drinking devices in accordance with the height of a pet.

SUMMARY OF THE INVENTION

It is therefore the primary objective of the present invention to provide a water drinking device for pets, which overcomes all the inherent shortcomings of the conventional water drinking devices for pets.

It is another objective of the present invention to provide a water drinking device for pets, which comprises a ventilation hole to facilitate the flowing of the water held in the device.

The foregoing objectives of the present invention are attained by a water drinking device for pets, which comprises a cylindrical vessel provided at the top thereof with a cap having a ventilation hole. The cylindrical vessel is further provided at the lower end thereof with a slanted bottom so as to ensure that the water outlet is higher in location than the bottom of the vessel and that the water flowing out of the water outlet is free from impurities. The cylindrical vessel is provided peripherally at different levels with a plurality of locating slots, each of which is provided respectively at both horizontal ends thereof with a locating recess engageable securely with a locating projection of the retaining arm of a vessel hanger.

The foregoing objectives, features and functions of the present invention will be more readily understood upon a thoughtful deliberation of the following detailed description of the present invention in conjunction with the accompanying drawings.

DETAILED DESCRIPTION OF THE INVENTION

Figure 1:
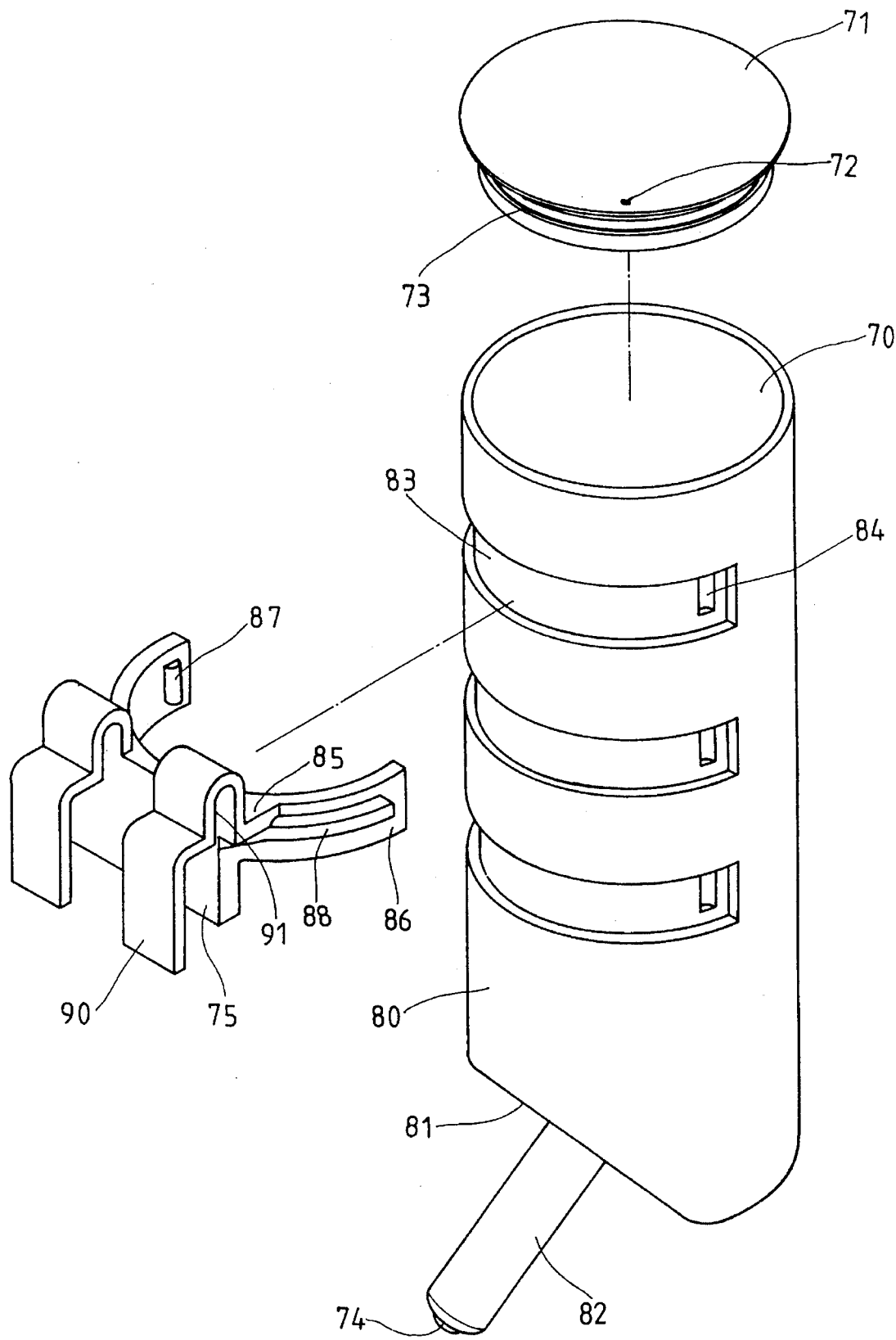
FIG. 1 shows an exploded view of the present invention.
Figure 2:
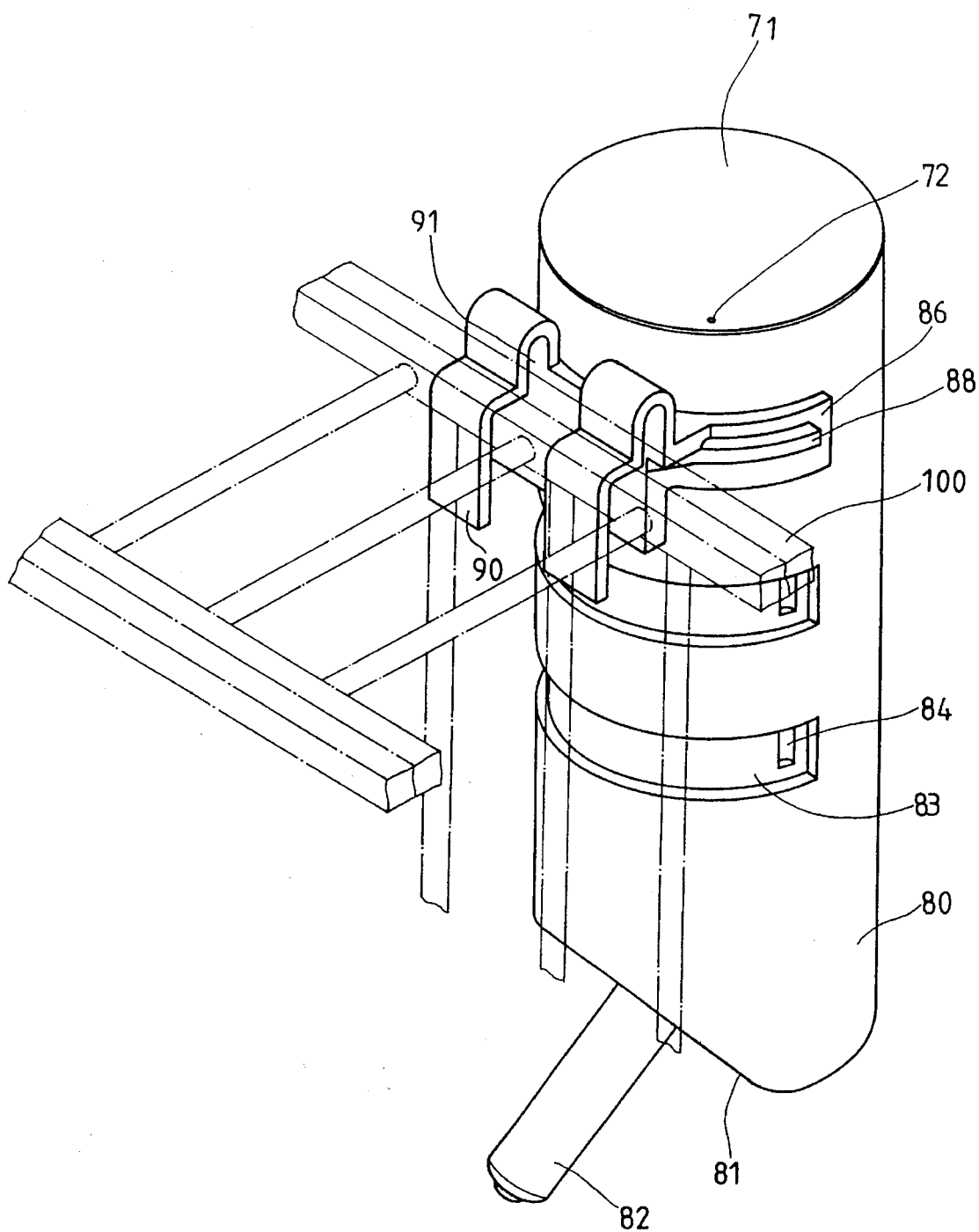
FIG. 2 shows a perspective view of the present invention in combination.

As shown in all drawings provided herewith, a water drinking device for pets of the present invention comprises a cylindrical vessel 80 which has an opening 70 located at the top thereof and provided with a cap 71 having a ventilation hole 72. The cap 71 is provided with a seal ring 73. The cylindrical vessel 80 is provided at the lower end thereof with a slanted bottom 81 from which a water outlet 82 is extended downwards. The water outlet 82 is provided therein with a steel ball 74 capable of stopping the water flow. The cylindrical vessel 80 is further provided peripherally at different levels thereof with a plurality of locating slots 83, which are provided respectively at both ends thereof with a locating recess 84.

The present invention further comprises a vessel hanger 85 having an arcuate retaining arm 86 which is provided respectively at both ends thereof with a locating projection 87 corresponding in location to and engageable with the locating recess 84 of the locating slot 83 of the cylindrical vessel 80. The arcuate retaining arm 86 is reinforced by a rib 88. The vessel hanger 85 is provided with a hook 90 having a retaining slot 91 and a retaining piece 75 for locating the vessel hanger 85 securely on a cage in which a pet is kept.

Figure 3:
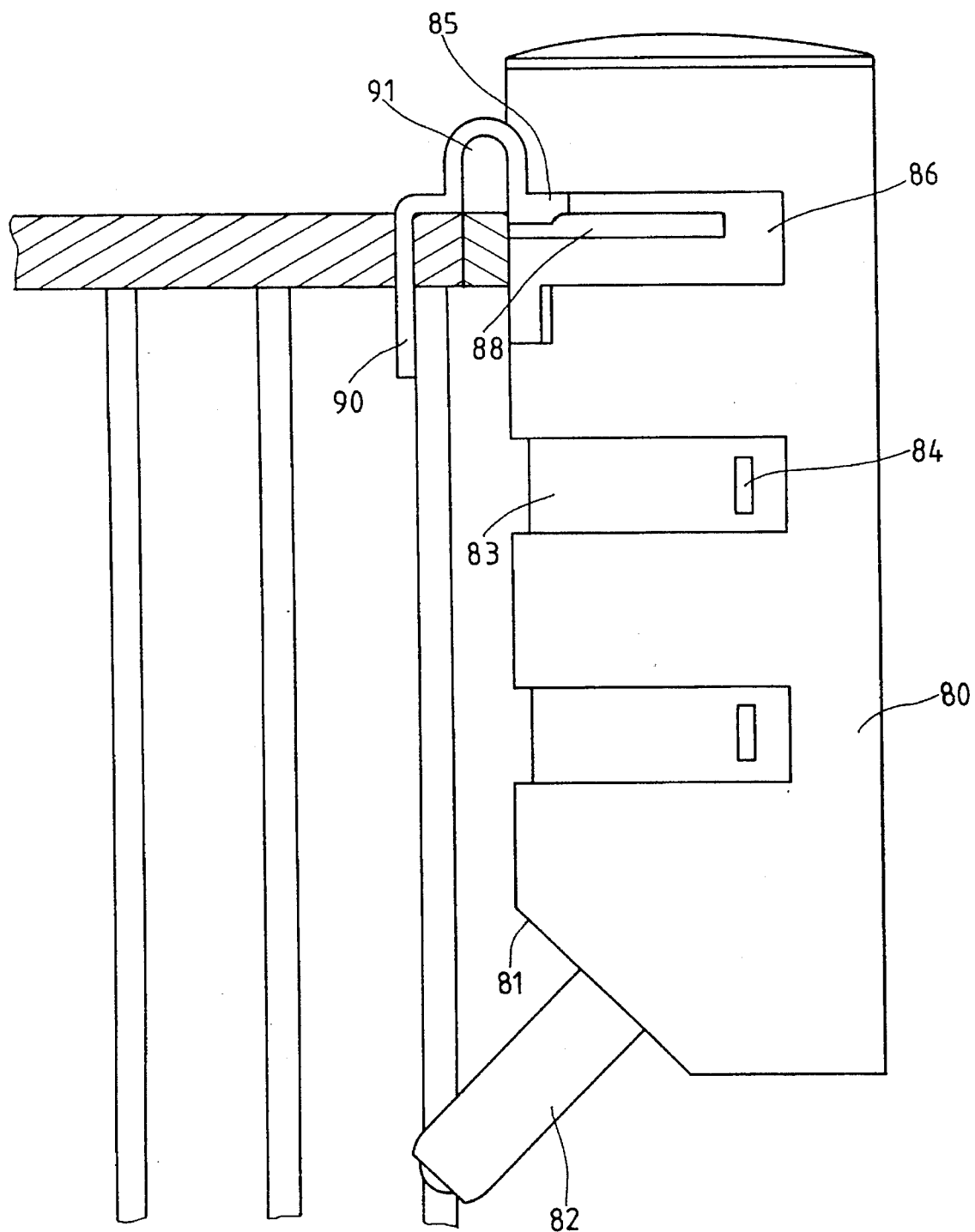
FIG. 3 shows a side elevational view of the present invention in combination.
Figure 4:
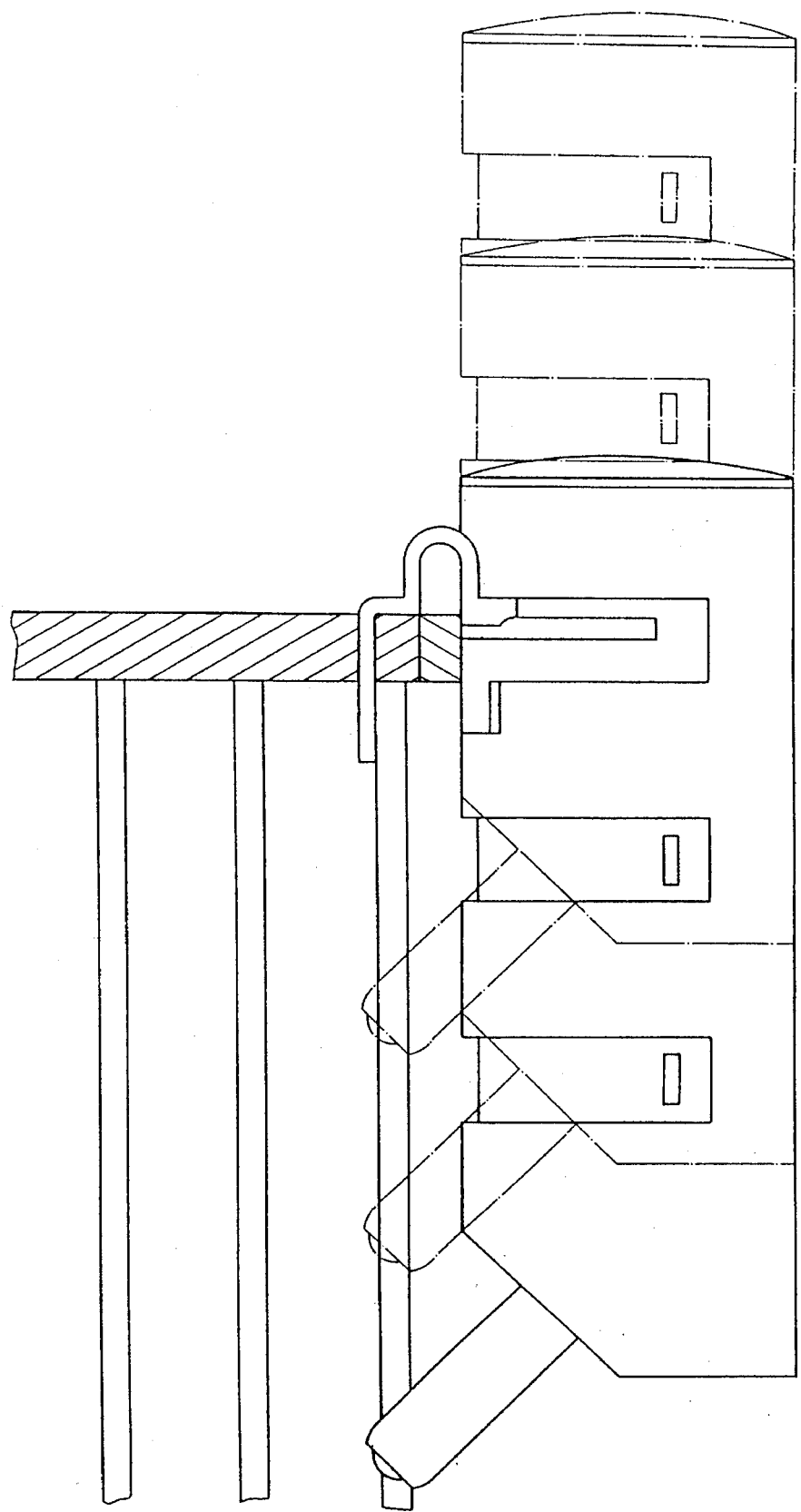
FIG. 4 is a schematic view illustrating the way that the position of the present invention is adjusted.

As illustrated in FIGS. 3 and 4, the advantages of the present invention are therefore readily apparent. The vessel hanger 85 of the present invention can be secured to the cylindrical vessel 80 at various levels. In addition, the vessel hanger 85 is provided with the retaining slot 91 and the retaining piece 75, which serve to hold the vessel hanger 85 securely on a bar 100 of the cage.

The cap 71 of the present invention is fastened detachably with the top end of the cylindrical vessel 80 and can be therefore removed to facilitate the replenishing of the cylindrical vessel 80 with fresh water and the cleaning of the interior of the cylindrical vessel 80. The cap 71 is provided with the ventilation hole 72, which serves to promote the flow of water contained in the cylindrical vessel 80.

The water outlet 82 is located at a level higher than the bottom of the slanted bottom of the cylindrical vessel 80. As a result, the pet is not subjected to drinking the contaminated water in view of the fact that impurities of water are deposited and kept at the very bottom of the slanted bottom of the cylindrical vessel 80.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claim.

What is claimed is:

1. A water drinking device for pets comprising:

a vessel provided at a top end thereof with an opening which is provided with a cap fastened detachably thereto, said vessel having a slanted bottom with a water outlet extending downwards from an upper level thereof, said vessel further provided peripherally at different levels thereof with a plurality of locating slots which are provided respectively at both ends thereof with a locating recess; and a vessel hanger having an arcuate retaining arm which is provided respectively at both ends thereof with a locating projection corresponding in location to and engageable with said locating recess of said locating slot of said vessel, said vessel hanger further having a hook engageable securely with a bar of a cage in which a pet is kept.

2. The water drinking device for pets as defined in claim 1, wherein said cap is provided with a ventilation hole.

3. The water drinking device for pets as defined in claim 1, wherein said cap is provided with a seal ring attached thereto.

4. The water drinking device for pets as defined in claim 1, wherein said water outlet is provided therein with a water stopper.

5. The water drinking device for pets as defined in claim 1, wherein said arcuate retaining arm of said vessel hanger is provided with a reinforcing rib attached thereto.

6. The water drinking device for pets as defined in claim 1, wherein said hook of said vessel hanger is integrally provided with a retaining slot and a retaining piece, which are capable of locating said vessel hanger on said bar of said cage.

* * * * *